US009977316B2

(12) United States Patent
Lin et al.

(10) Patent No.: US 9,977,316 B2
(45) Date of Patent: May 22, 2018

(54) PROJECTION APPARATUS AND ILLUMINATION SYSTEM THEREOF

(71) Applicant: Coretronic Corporation, Hsin-Chu (TW)

(72) Inventors: Yao-Shun Lin, Hsin-Chu (TW); Chia-Hao Wang, Hsin-Chu (TW); Ko-Shun Chen, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 79 days.

(21) Appl. No.: 15/199,453

(22) Filed: Jun. 30, 2016

(65) Prior Publication Data

US 2017/0153535 A1 Jun. 1, 2017

(30) Foreign Application Priority Data

Nov. 27, 2015 (CN) .......................... 2015 1 0847315

(51) Int. Cl.

| G03B 21/14 | (2006.01) |
|---|---|
| G03B 21/20 | (2006.01) |
| F21V 8/00 | (2006.01) |
| G03B 21/00 | (2006.01) |
| G03B 33/12 | (2006.01) |
| G03B 33/08 | (2006.01) |

(52) U.S. Cl.
CPC .......... *G03B 21/204* (2013.01); *G02B 6/001* (2013.01); *G02B 6/0003* (2013.01); *G02B 6/0006* (2013.01); *G03B 21/006* (2013.01); *G03B 21/008* (2013.01); *G03B 21/208* (2013.01); *G03B 33/12* (2013.01); *G03B 33/08* (2013.01)

(58) Field of Classification Search
CPC .. G03B 21/204; G03B 21/006; G03B 21/008; G02B 6/0003; G02B 6/006001; F21V 9/16
USPC ................... 362/84, 293; 313/483, 501, 502
See application file for complete search history.

(56) References Cited

U.S. PATENT DOCUMENTS

| 8,098,375 | B2 |  | 1/2012 | Brukilacchio |  |
|---|---|---|---|---|---|
| 8,662,672 | B2 | * | 3/2014 | Hikmet | G03B 21/20 353/31 |
| 9,423,083 | B2 | * | 8/2016 | Osinski | B82Y 20/00 |
| 9,466,771 | B2 | * | 10/2016 | Anc | C09K 11/025 |
| 2008/0232084 | A1 | * | 9/2008 | Kon | G02B 6/0003 362/84 |
| 2013/0083296 | A1 | * | 4/2013 | Ogura | G03B 21/204 353/31 |

(Continued)

FOREIGN PATENT DOCUMENTS

| CN | 101373317 A |  | 2/2009 |  |
|---|---|---|---|---|
| WO | WO2016/132706 | * | 8/2016 | ............. G03B 21/14 |

*Primary Examiner* — William C Dowling
(74) *Attorney, Agent, or Firm* — Li-Jen Shen

(57) ABSTRACT

An illumination system includes a light integration rod and a light source module. The light integration rod has a light-in end, a light-out end opposite to the light-in end, and phosphor distributed between the light-in end and the light-out end. The light source module is configured to provide a laser beam to enter into the light integration rod through the light-in end thereof. The phosphor is used to convert the laser beam into a first color beam to form an illumination beam. The illumination beam then emits out from the light integration rod through the light-out end thereof. A projection apparatus using the aforementioned illumination system is also provided.

16 Claims, 12 Drawing Sheets

(56) References Cited

U.S. PATENT DOCUMENTS

2014/0022779 A1* 1/2014 Su .................. H01L 33/504
                                                    362/231
2018/0024425 A1* 1/2018 Fujita ............... G03B 21/204

* cited by examiner

PROJECTION APPARATUS AND ILLUMINATION SYSTEM THEREOF

FIELD OF THE INVENTION

The invention relates to a display apparatus, and more particularly to a projection apparatus and an illumination system thereof.

BACKGROUND OF THE INVENTION

Digital light processing (DLP) projection apparatus includes an illumination system, a digital micro-mirror device (DMD) and a projection lens. The illumination system is used to provide an illumination beam; the digital micro-mirror device is used to convert the illumination beam into an image beam; and the projection lens is used to project the image beam onto a screen, thereby forming images on the screen. Conventionally, illumination system usually uses high pressure mercury lamp as light source for providing white lights as the illumination beam. However, with the development of illumination technology, light emitting diode (LED) and laser light source with power saving feature have gradually been used as the light source for the illumination system.

FIG. 1 is a schematic view of a conventional illumination system provided with a laser light source. In the conventional illumination system 100 as shown in FIG. 1, a blue beam 112 provided by a laser light source module 110 sequentially passes through a collimator element 122, a dichroic mirror 130 and lenses 123, 124 and then emits onto a rotating phosphor wheel 140. The phosphor wheel 140 may include a green phosphor area, a yellow phosphor area and an opening area. A back 141 of the green phosphor area and the yellow phosphor area of the phosphor wheel 140 is correspondingly disposed with reflective elements (not shown). The blue beam 112 sequentially emits to the green phosphor area, the yellow phosphor area and the opening area. A green beam 113 and a yellow beam 114 are generated when the green phosphor area and the yellow phosphor area are emitted and excited by the blue beam 112, respectively. The green beam 113 and the yellow beam 114 are reflected to the dichroic mirror 130 by the reflective elements. Then, the green beam 113 and the yellow beam 114 are reflected by the dichroic mirror 130, and the green beam 113 and the yellow beam 114 pass through a lens 125 and then sequentially emit onto a rotating wheel 150. In addition, a portion of the blue beam 112 sequentially passes through the opening area, lenses 126, 127, reflective elements 161, 162, a lens 128, a reflective element 163, a lens 129, the dichroic mirror 130, the lens 125 and then emits on the color wheel 150.

The color wheel 150 has a red filter area and a transparent area corresponding to the aforementioned yellow phosphor area, a green filter area corresponding to the aforementioned green phosphor area, and a diffusion area corresponding to the aforementioned opening area. Through controlling the color wheel 150 and the phosphor wheel 140 to rotate with each other, the green beam 113 emits to the green filter area, the yellow beam 114 emits to the red filter area and the transparent area, and the blue beam 112 emits to the diffusion area (not shown). Thus, the beam passing through the color wheel 150 and then entering a light integration rod 170 contains blue, green and red beams for forming color images and yellow beams for enhancing the brightness.

However, as shown in FIG. 1, the conventional illumination system 100 has a relatively complicated structure and requires a lot of optical components; therefore, the conventional illumination system 100 has some disadvantages such as higher cost, larger component size and poor optical efficiency.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One object of the invention is to provide an illumination system able to reduce the number of the optical element therein and consequentially reduce the cost and component size thereof.

Another object of the invention is to provide a projection apparatus having certain advantages such as reduced cost and component size.

Other objects and advantages of the invention can be further illustrated by the technical features broadly embodied and described as follows.

In order to achieve one or a portion of or all of the objects or other objects, the invention provides an illumination system, which includes a light integration rod and a light source module. The light integration rod has a light-in end, a light-out end opposite to the light-in end, and phosphor distributed between the light-in end and the light-out end. The light source module is configured to provide a laser beam to enter into the light integration rod through the light-in end thereof. The phosphor is used to convert the laser beam into a first color beam to form an illumination beam. The illumination beam then emits out from the light integration rod through the light-out end thereof.

In order to achieve one or a portion of or all of the objects or other objects, the invention provides a projection apparatus, which includes the aforementioned illumination system, a light valve unit and a projection lens. The light valve unit is disposed on a transmission path of the illumination beam and configured to convert the illumination beam into an image beam. The projection lens is disposed on a transmission path of the image beam.

In one embodiment, the illumination system further includes a color wheel disposed on the transmission path of the illumination beam. The light integration rod is disposed between the light source module and the color wheel. The color wheel is configured to sequentially filter the illumination beam into a plurality of sub illumination beams with different colors. The light valve unit includes a digital micro-mirror device configured to sequentially convert the sub illumination beams into a plurality of sub image beams.

In one embodiment, the illumination system further includes a lens disposed between the light integration rod and the light valve unit. The lens is configured to receive the illumination beam emitted out from the light integration rod through the light-out end thereof.

In one embodiment, the light valve unit includes a first reflective liquid crystal panel, a second reflective liquid crystal panel and a third reflective liquid crystal panel. The projection apparatus further includes an X-type beam combiner element disposed among the first reflective liquid crystal panel, the second reflective liquid crystal panel and the third reflective liquid crystal panel.

In one embodiment, the light valve unit includes a first transmissive liquid crystal panel, a second transmissive liquid crystal panel and a third transmissive liquid crystal panel. The projection apparatus further includes an X-type beam combiner element disposed among the first transmissive liquid crystal panel, the second transmissive liquid crystal panel and the third transmissive liquid crystal panel.

Summarily, in the illumination system of the invention, the phosphor is disposed in the light integration rod; therefore, compared with the prior art, the number of the optical elements needed in the illumination system of the invention is significantly reduced, and consequentially the projection apparatus 400 of the embodiment has reduced cost and component size. Consequentially, the projection apparatus of the invention also has reduced cost and component size by employing the aforementioned illumination system.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 2:
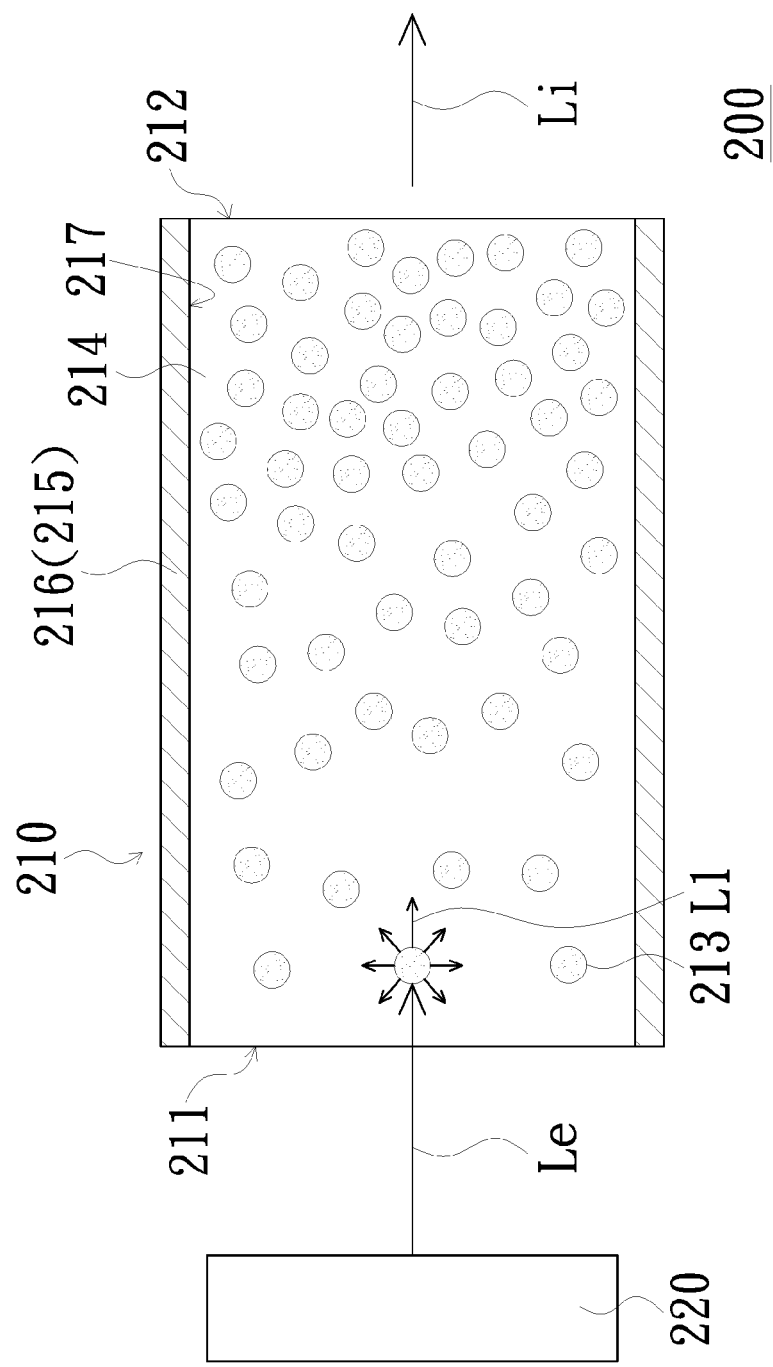
FIG. 2 is a schematic view of an illumination system in accordance with an embodiment of the invention.

FIG. 2 is a schematic view of an illumination system in accordance with an embodiment of the invention. The illumination system of the embodiment may be applied to a projection apparatus; however, the application of the illumination system is not limited in the invention. As shown in FIG. 2, the illumination system 200 of the embodiment includes a light integration rod 210 and a light source module 220. The light integration rod 210 has a light-in end 211, a light-out end 212 opposite to the light-in end 211, and phosphor 213 distributed between the light-in end 211 and the light-out end 212. The light source module 220 is configured to provide a laser beam Le to enter into the light integration rod 210 through the light-in end 211 thereof. The phosphor 213 is used to convert the laser beam Le into a first color beam L1 to form an illumination beam Li. The illumination beam Li then emits out from the light integration rod 210 through the light-out end 212 thereof.

In the embodiment, the light integration rod 210 further has a solid column 214 and a reflective body 215. The above-described light-in end 211 and the light-out end 212 are the two end surfaces of the solid column 214. The solid column 214 is wrapped by the reflective body 215; and the light-in end 211 and the light-out end 212 are exposed from the reflective body 215. The phosphor 213 is distributed in the solid column 214. Furthermore, the solid column 214 may have materials such as ceramic or glass or certain material with heat resistance characteristics. In one embodiment, the phosphor 213 is distributed in the solid column 214 by method of sintering the phosphor 213 by ceramic or glass. However, the material of the solid column 214 and the method of distributing the phosphor 213 in the solid column 214 are not limited in the invention. Furthermore, the solid column 214 may be a rectangular column. The reflective body 215 may include a plurality of reflective sheets 216, and each of which is disposed on a side surface 217 of the solid column 214 and configured to reflect the lights (such as the laser beam Le and the first color beam L1) in the solid column 214, thereby avoiding light leakage. The specific structure of the reflective body 215 is not limited in the invention. In another embodiment, the reflective body 215 may be a reflective coating layer coated on each side surface 217 of the solid column 214.

Figure 3:
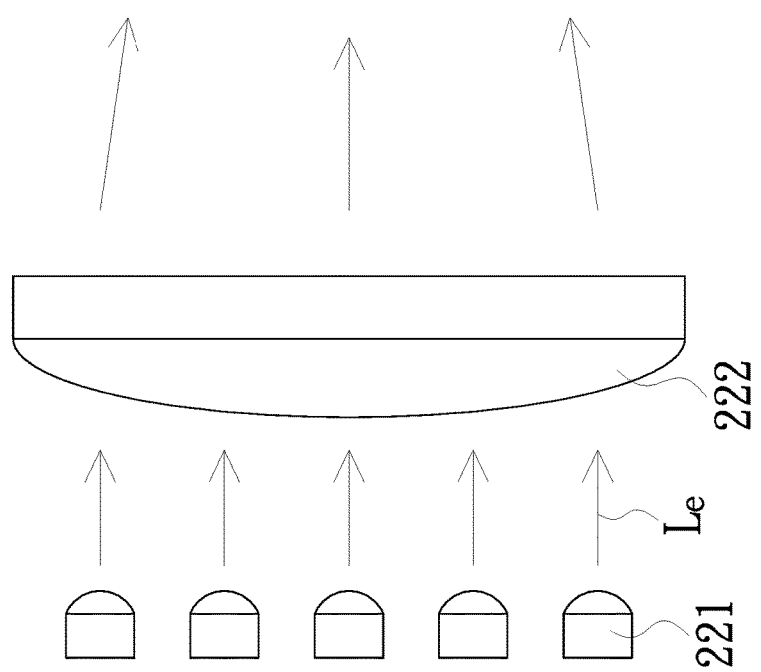
FIG. 3 is a schematic view of a light source module in accordance with an embodiment of the invention.

The above-mentioned light source module 220 may have a structure shown in FIG. 3, but the invention is not limited thereto. As shown in FIG. 3, for example, a light source module may include a plurality of laser light emitting elements 221 and a lens 222. The lens 222 is disposed between the laser emitting elements 221 and the light-in end 211 of the light integration rod 210 (FIG. 2). The laser emitting elements 221 may be arranged in a matrix manner and configured to provide the laser beam Le. The type of the light emitting element of the light source module is not limited in the invention. In another embodiment, the light emitting element may be a light emitting diode element or other suitable light emitting elements. In addition, the lens 222 may be omitted or replaced by other suitable optical elements in response to the actual design requirements.

Please refer to FIG. 2 again. The laser beam Le may be a visible light or a non-visible light; the color of the first color beam L1 may depend on the design requirements; and the phosphor 213 may be selected depend on the design requirements. In the embodiment, the illumination beam Li is referred to as a visible light emitted out from the light-out end 212. For example, the laser beam Le is a blue light, and the first color beam L1 emitted to various directions from the phosphor 213 excited by the blue light may be a yellow light. A white light is formed by a mix of the yellow light and the blue light not absorbed by the phosphor 213, and the white light emitted out from the light-out end 212 of the light integration rod 210 is the illumination beam Li. In another embodiment, the laser beam Le is an ultraviolet light, and the first color beam L1 emitted from the phosphor 213 excited by the ultraviolet light may be a white light. The white light emitted out from the light-out end 212 of the light integration rod 210 is the illumination beam Li.

Figure 1:
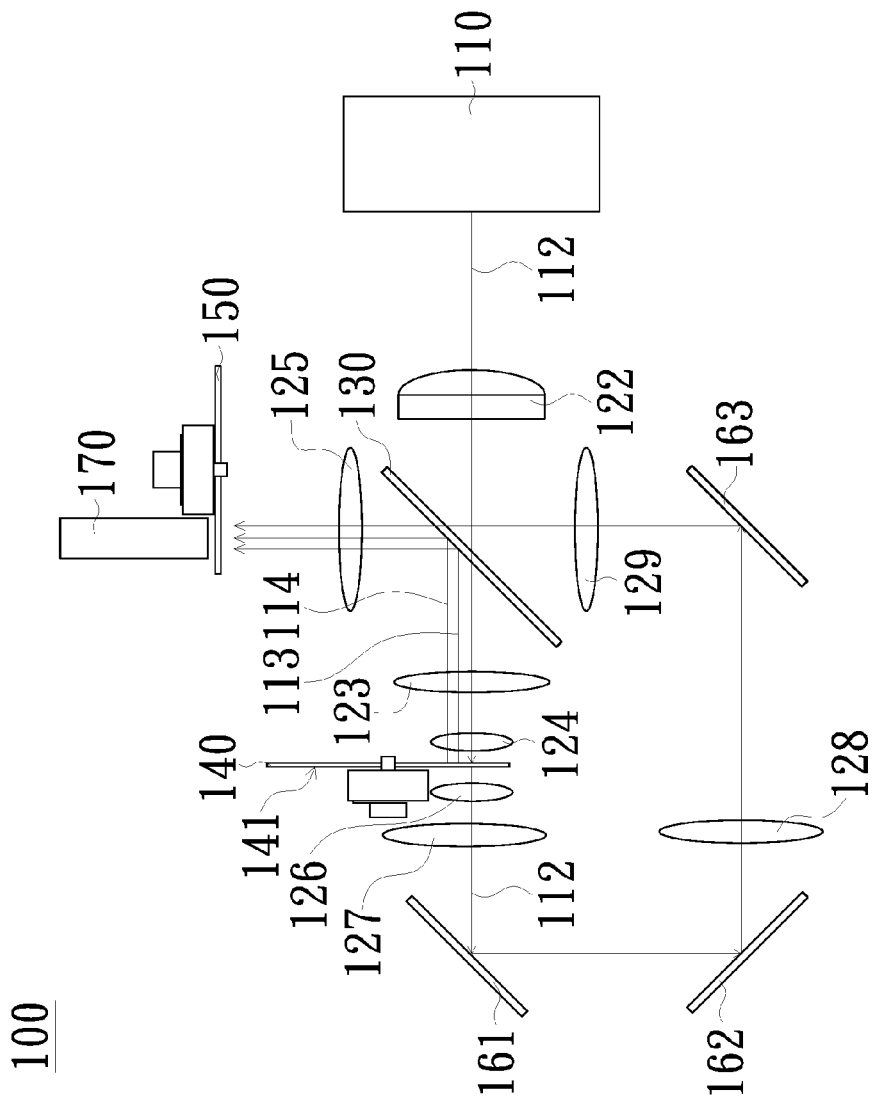
FIG. 1 is a schematic view of a conventional illumination system using a laser light source.

In the illumination system 200 of the embodiment, the phosphor 213 is disposed in the light integration rod 210; therefore, the illumination beam Li can be formed through using the laser beam Le provided by the light source module 220 to excite the phosphor 213 in the light integration rod 210. Compared with the conventional illumination system 100 of FIG. 1, the number of the optical elements needed in the illumination system 200 of the embodiment is significantly reduced, and consequentially the illumination system 200 of the embodiment has reduced cost and component size.

It is to be noted that the laser beam Le has a higher energy at the light-in end 211 and the phosphor 213 may also generate heat after absorbing the laser beam Le. In order to avoid the heat generated by the phosphor 213 is accumulated excessively so as to reduce the light conversion efficiency of the phosphor 213 or even burn out the phosphor 213, the phosphor 213 closed to the light-in end 211 may have a relatively-low distribution density to the light-out end 212. In one embodiment, the distribution density of the phosphor 213 may gradually increase from the light-in end 211 to the light-out end 212; however, the invention is not limited thereto. In another embodiment, the distribution density of the phosphor 213 may gradually increase from the light-in end 211 to the middle part of the light integration rod 210 and then gradually decrease from the middle part of the light integration rod 210 to the light-out end 212. In still another embodiment, no phosphor 213 is disposed between the light-in end 211 and the middle part of the light integration rod 210, and then the distribution density of the phosphor 213 may gradually decrease from the middle part of the light integration rod 210 to the light-out end 212.

Figure 4:
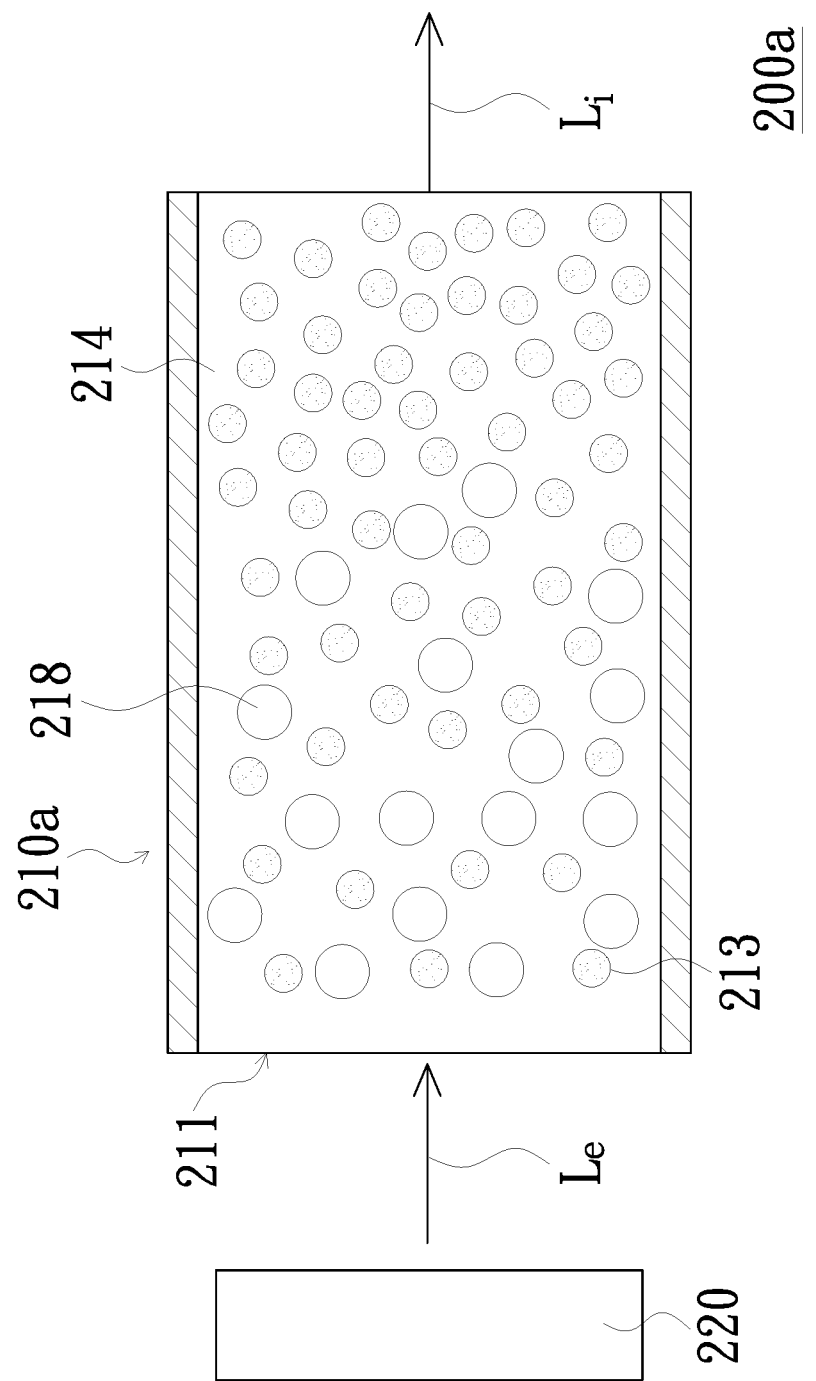
FIG. 4 is a schematic view of an illumination system in accordance with another embodiment of the invention.

FIG. 4 is a schematic view of an illumination system in accordance with another embodiment of the invention. As shown in FIG. 4, the illumination system 200a of the embodiment is similar to the illumination system 200 of FIG. 2. A difference lies in that the light integration rod 210a of the illumination system 200a of the embodiment further includes a plurality of transparent beads 218 distributed in the solid column 214. The refractive indexes of the transparent beads 218 are different to that of the solid column 214. Because of the transparent bead 218 and the solid column 214 have different refractive indexes, the transparent beads 218 may be used to refract the first color beam L1 excited out in the solid column 214 and also refract the laser beam Le in the solid column 214, thereby enhancing the beam homogenization. The material of the transparent bead 218 may be glass, but the invention is not limited thereto.

Figure 5:
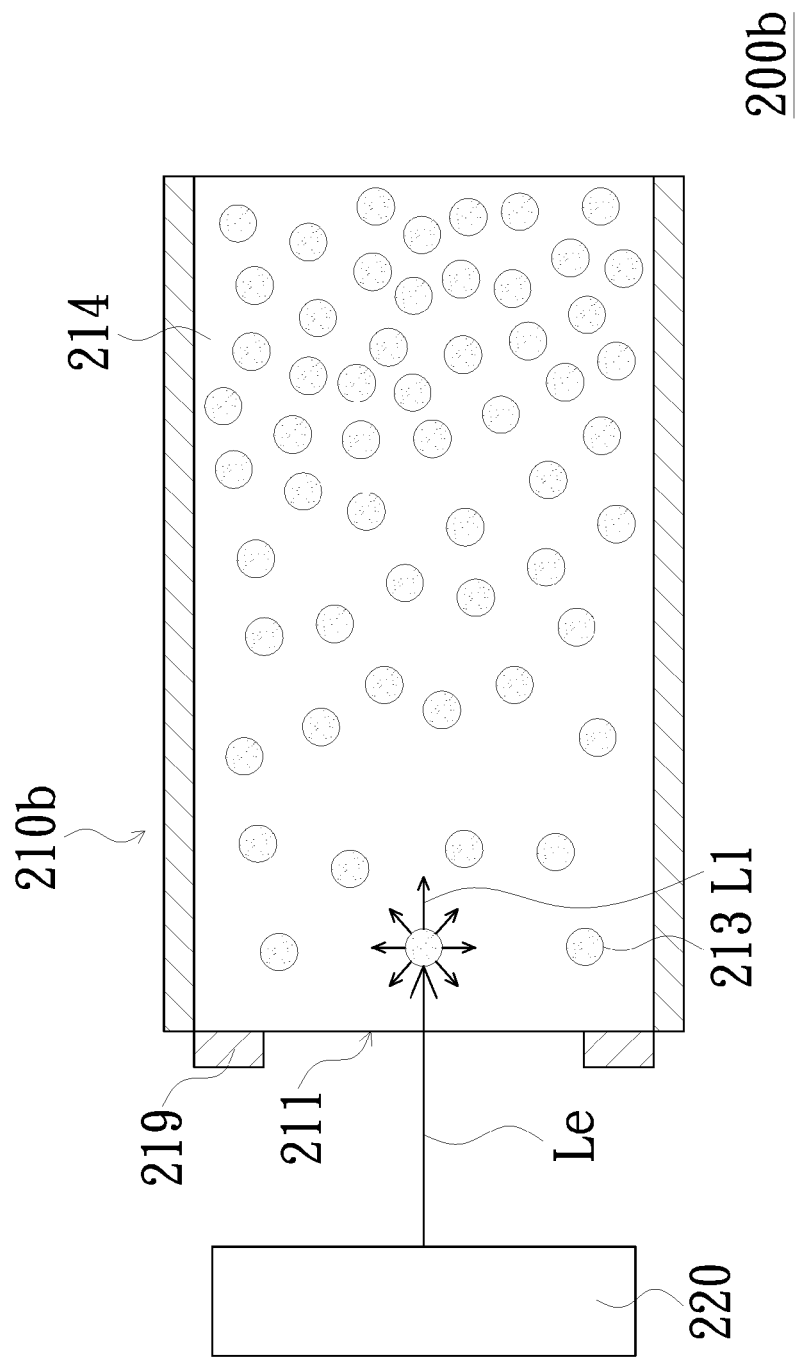
FIG. 5 is a schematic view of an illumination system in accordance with another embodiment of the invention.

FIG. 5 is a schematic view of an illumination system in accordance with another embodiment of the invention. As shown in FIG. 5, the illumination system 200b of the embodiment is similar to the illumination system 200 of FIG. 2. A difference is that the light integration rod 210b of the illumination system 200b of the embodiment further includes a reflective element 219, which covers the periphery of the light-in end 211. Specifically, the reflective element 219 covers the area of the light-in end 211 not emitted by the laser beam Le. The reflective element 219 reflects the lights to the light-out end in the solid column 214 (such as transmitting a portion of the first color beam L1 toward the light-in end 211), thereby reducing the light leakage at the light-in end 211 and enhancing the light utilization efficiency. In another embodiment, the reflective element 219 may be also disposed in the periphery of the light-in end 211 of the light integration rod 210a in FIG. 4.

Figure 6:
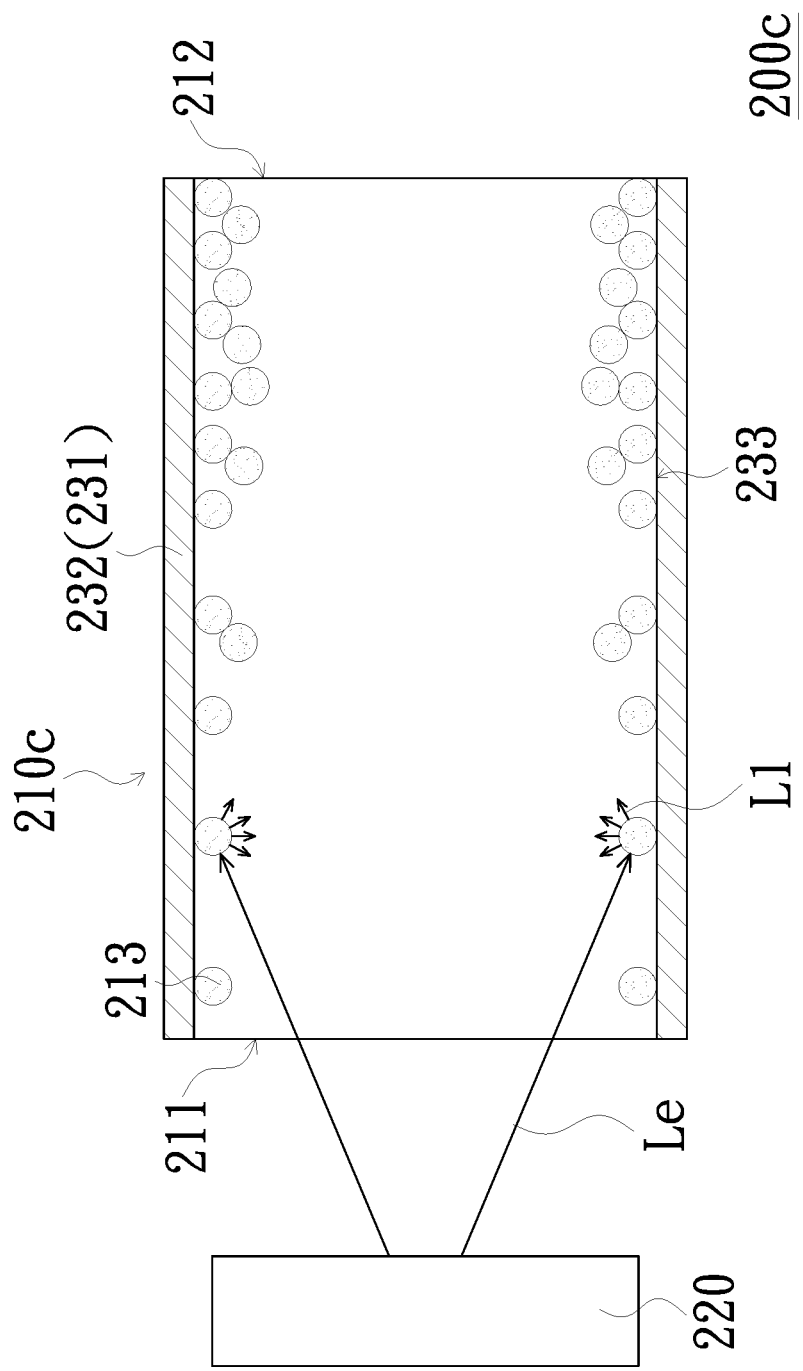
FIG. 6 is a schematic view of an illumination system in accordance with another embodiment of the invention.

FIG. 6 is a schematic view of an illumination system in accordance with another embodiment of the invention. As shown in FIG. 6, the illumination system 200c of the embodiment is similar to the illumination system 200 of FIG. 2. A difference is that the light integration rod 210c of the illumination system 200c of the embodiment includes a hollow column 231 rather than the solid column 214 in FIG. 2. The two ends of the hollow column 231 are the light-in end 211 and the light-out end 212 of the light integration rod 210c. The phosphor 213 is distributed on an inner surface 233 of the hollow column 231. The hollow column 231 may be a rectangular column formed by a combination of a plurality of reflective sheets 232. In one embodiment, the distribution density of the phosphor 213 may gradually increase from the light-in end 211 to the light-out end 212; however, the invention is not limited thereto. In another embodiment, the distribution density of the phosphor 213 may gradually increase from the light-in end 211 to the middle part of the light integration rod 210 and then gradually decrease from the middle part of the light integration rod 210 to the light-out end 212. In another embodiment, no phosphor 213 is disposed between the light-in end 211 and the middle part of the light integration rod 210, and then the distribution density of the phosphor 213 may gradually decrease from the middle part of the light integration rod 210 to the light-out end 212. The light-in end 211 of the light integration rod 210c may be provided with the reflective element 219 in FIG. 5.

Figure 7:
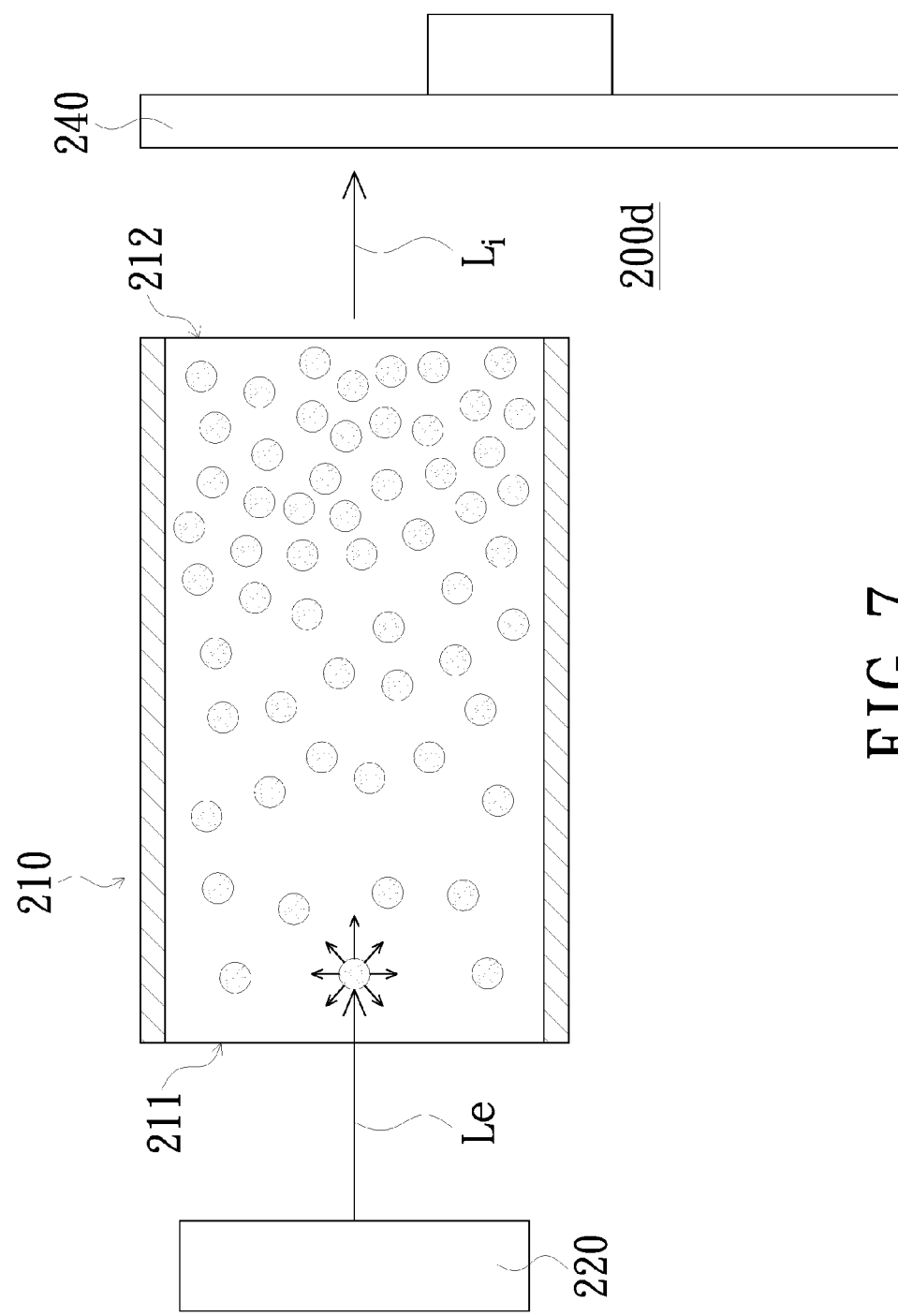
FIG. 7 is a schematic view of an illumination system in accordance with another embodiment of the invention.

FIG. 7 is a schematic view of an illumination system in accordance with another embodiment of the invention. As shown in FIG. 7, the illumination system 200d of the embodiment is similar to the illumination system 200 of FIG. 2. A difference is that the illumination system 200d of the embodiment further includes a color wheel 240 disposed on the transmission path of the illumination beam Li. The light integration rod 210 is disposed between the light source module 220 and the color wheel 240. The periodically-rotating color wheel 240 is configured to filter the illumination beam Li into a plurality of lights with different colors, such as red light, blue light, green light and yellow light. In addition, the above-described illumination systems 200a, 200b and 200c may also include the color wheel 240.

Figure 8:
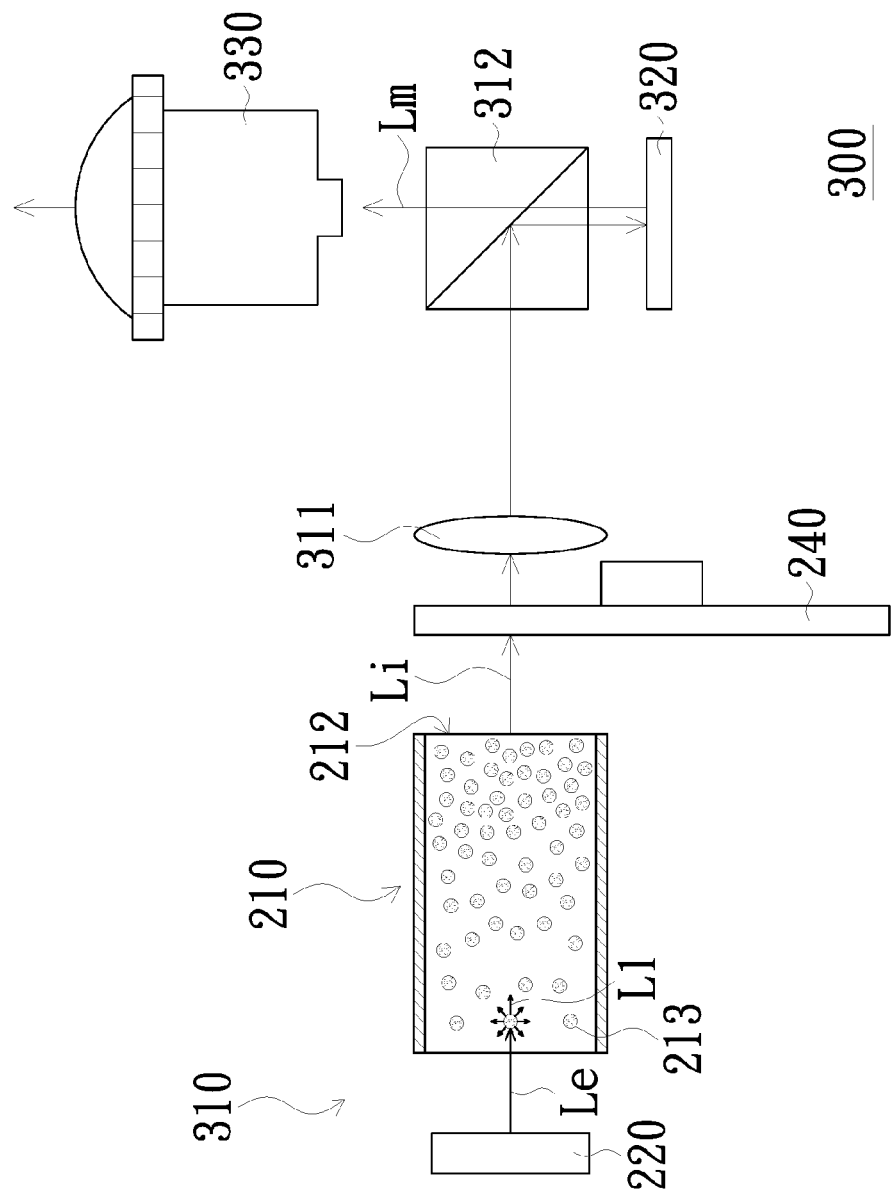
FIG. 8 is a schematic view of a projection apparatus in accordance with an embodiment of the invention.

FIG. 8 is a schematic view of a projection apparatus in accordance with an embodiment of the invention. As shown in FIG. 8, the projection apparatus 300 of the embodiment includes an illumination system 310, a light valve unit 320 and a projection lens 330. The light valve unit 320 is disposed on the transmission path of the illumination beam Li provided by the illumination system 310 and configured to convert the illumination beam Li into an image beam Lm. The projection lens 330 is disposed on the transmission path of the image beam Lm and configured to project the image beam Lm onto a screen so as to form an image on the screen.

The structure of the illumination system 310 of the embodiment of FIG. 8 is similar to that of the illumination system 200d of FIG. 7, such as both include the light source module 220, the light integration rod 210 and the color wheel 240. The laser beam Le provided by the light source module 220 is used to excite the phosphor 213 to emit out the first color beam L1. The illumination beam Li is formed by a mix of the first color beam L1 and the laser beam Le not absorbed by the phosphor 213. In one embodiment, the laser beam Le may be a blue light; the first color beam L1 may be a yellow light; and the illumination beam Li may be a white light formed by a mix of the blue light and the yellow light. In another embodiment, the laser beam Le may be an ultraviolet light; the first color beam L1 may be a white light; and the illumination beam Li is the first color beam L1. The color wheel 240 is configured to sequentially filter the illumination beam Li into a plurality of sub illumination beams with different colors, such as red illumination beam, green illumination beam and green illumination beam. The illumination system 310 may further include a lens 311 disposed between the light integration rod 210 and the light valve unit 320. The lens 311 is configured to receive the illumination beam Li emitted out from the light integration rod 210 through the light-out end 212 thereof. In addition, the illumination system 310 may further include an internal total reflection prism 312 disposed on the transmission path of the illumination beam Li. The internal total reflection prism 312 is configured to reflect the illumination beam Li to the light valve unit 320.

The light valve unit 320 may be one sheet of reflective light valve such as a digital micro-mirror device and configured to sequentially convert the sub illumination beams into a plurality of sub image beams such as red sub image beam, green sub beam imaging and blue sub image beam. These sub image beams then pass through the internal total reflection prism 312 and are projected on the screen through the projection lens 330, thereby sequentially forming a plurality of sub image on the screen. Because of the persistence of vision, a user may see a colorful image which is formed by a superposition of the plurality of sub images.

In the illumination system 310 of the projection apparatus 300 of the embodiment, the phosphor 213 is disposed in the light integration rod 210; therefore, the illumination beam Li can be formed through using the laser beam Le provided by the light source module 220 to excite the phosphor 213 in the light integration rod 210. Compared with the conventional illumination system 100 of FIG. 1, the number of the optical elements needed in the projection apparatus 300 of the embodiment is significantly reduced, and consequentially the projection apparatus 300 of the embodiment has reduced cost and component size.

It is to be noted that the light integration rod 210 can be replaced by any one of the above-described light integration rods, such as the light integration rods 210a, 210b or 210c. In addition, although the projection apparatus 300 of FIG. 8 is exemplified by a stricture having the internal total reflection prism 312, but the invention is not limited thereto. In another embodiment, the projection apparatus may have a structure using a reflective element to reflect the illumination beam to the light valve unit 320 or other suitable structures. Further, the light valve unit 320 may be a liquid crystal on silicon panel (LCoS panel), and accordingly the types and the arrangement positions of the associated optical elements need an appropriate adjustment. The color wheel 240 may be omitted if the light valve unit has a color filter. For example, if the light valve unit 320 is a reflective liquid crystal panel with a color filter (e.g., a silicon liquid crystal panel with a color filter), the color wheel 240 may be omitted. In another embodiment, the light valve unit may employ a transmissive light valve (e.g., a transmissive liquid crystal panel), and accordingly the types and the arrangement positions of the associated optical elements need an appropriate adjustment. The adjustments of the types and arrangement positions of the associated optical elements in response to the various types of the adopted light valve are well known in the art, no redundant detail is to be given herein. In addition, if the transmissive light valve has a color filter, the color wheel 240 may be omitted.

Although the light valve unit 320 in the projection apparatus 300 is exemplified by one single sheet of light valve, but the invention is not limited thereto. In another embodiment, the light valve unit 320 may include a plurality of sheets of light valve. The embodiment of having a plurality of sheets of light valve will be described hereunder.

Figure 9:
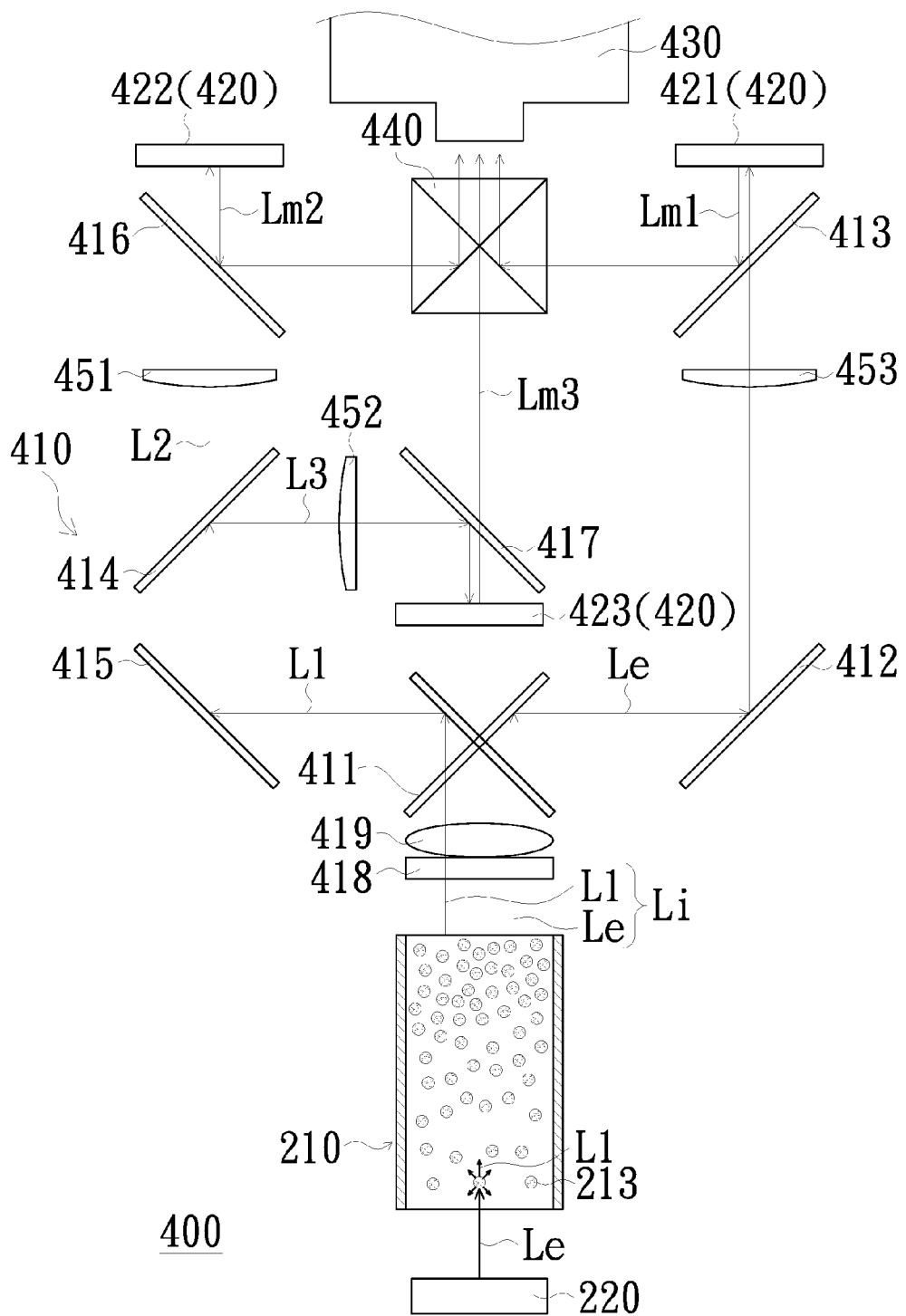
FIG. 9 is a schematic view of a projection apparatus in accordance with another embodiment of the invention.

FIG. 9 is a schematic view of a projection apparatus in accordance with another embodiment of the invention. As shown in FIG. 9, the projection apparatus 400 of the embodiment includes an illumination system 410, a light valve unit 420 and a projection lens 430. The structure of the illumination system 410 of the embodiment is similar to that of the illumination system 200 of FIG. 2, such as both include the light source module 220 and the light integration rod 210. The light valve unit 420 includes a first reflective liquid crystal panel 421, a second reflective liquid crystal panel 422 and a third reflective liquid crystal panel 423. The projection apparatus 400 further includes an X-type beam combiner element 440 disposed among the first reflective liquid crystal panel 421, the second reflective liquid crystal panel 422 and the third reflective liquid crystal panel 423. The first reflective liquid crystal panel 421, the second reflective liquid crystal panel 422 and the third reflective liquid crystal panel 423 each may be a liquid crystal on silicon panel.

The illumination system 410 of the embodiment further includes an X-type dichroic element 411, a first reflective element 412, a first polarization light splitter element 413, a light splitter sheet 414, a second reflective element 415, a second polarization light splitter element 416 and a third polarization light splitter element 417. The operation of the projection apparatus 400 is described hereunder based on that that the illumination beam Li includes the laser beam Le provided by the light source module 220 and the first color beam L1 emitted out from the phosphor 213; wherein the laser beam Le is a blue light and the first color beam L1 is a yellow light. However, according to the above description, it is understood that the illumination beam Li may include only the first color beam L1 in another embodiment.

In the embodiment, the X-type dichroic element 411 is disposed on the transmission path of the illumination beam Li and configured to split the illumination beam Li into two beams having different colors and transmitting in the opposite directions. Specifically, in the embodiment, the X-type dichroic element 411 reflects the laser beam Le in the illumination beam Li and the first color beam L1 toward the opposite directions. The wavelength ranges of the laser beam Le and the first color beam L1 may have a slight change after being reflected by the X-type dichroic element 411; however, the two beams are still located within the wavelength ranges of blue and yellow lights, respectively. The first reflective element 412 is disposed on the transmission path of the laser beam Le reflected by the X-type dichroic element 411 and configured to transmit the laser beam Le toward the first reflective liquid crystal panel 421. The first polarization light splitter element 413 is disposed between the first reflective element 412 and the first reflective liquid crystal panel 421 and configured to allow a portion of the laser beam Le having a first polarization (e.g., P polarization) to pass therethrough and transmit this portion of beam to the first reflective liquid crystal panel 421. The first reflective liquid crystal panel 421 is configured to convert the laser beam Le having the first polarization into the first sub image beam Lm1 having a second polarization (e.g., S polarization). The first sub image beam Lm1 is then reflected to the X-type beam combiner element 440 sequentially by the first reflective liquid crystal panel 421 and the first polarization light splitter element 413.

The light splitter sheet 414 is disposed on the transmission path of the first color beam L1 reflected by the X-type dichroic element 411 and configured to split the first color beam L1 into the second color beam L2 and the third color bean L3. The second color beam L2 then passes through the light splitter sheet 414 and the third color bean L3 is then reflected by the light splitter sheet 414. The second color beam L2 and the third color bean L3 each are either red light or green light. In one embodiment, for example, the second color beam L2 is a red light and the third color bean L3 is a green light. The second reflective element 415 is disposed between the light splitter sheet 414 and the X-type dichroic element 411 and configured to reflect the first color beam L1 to the light splitter sheet 414.

The second polarization light splitter element 422 is disposed between the light splitter sheet 414 and the second reflective liquid crystal panel 422 and configured to allow a portion of the second color beam L2 having a first polarization (e.g., P polarization) to pass therethrough and transmit this portion of beam to the second reflective liquid crystal panel 422. The second reflective liquid crystal panel 422 is configured to convert the second color beam L2 having the first polarization into the second sub image beam Lm2 having a second polarization (e.g., S polarization). The second sub image beam Lm2 is then reflected to the X-type beam combiner element 430 sequentially by the second reflective liquid crystal panel 422 and the second polarization light splitter element 416.

The third polarization light splitter element 417 is disposed between the light splitter sheet 414 and the third reflective liquid crystal panel 423 and configured to reflect a portion of the third color beam L3 having a first polarization (e.g., P polarization) to the third reflective liquid crystal panel 423. The third reflective liquid crystal panel 423 is configured to convert the third color beam L3 having the first polarization into the third sub image beam Lm3 having a second polarization (e.g., S polarization). The third sub image beam Lm3 is then reflected by the third reflective liquid crystal panel 423 to pass through the third polarization light splitter element 417 and then transmitted to the X-type beam combiner element 440. The X-type beam combiner element 440 is configured to reflect the first sub image beam Lm1 and the second sub image beam Lm2 and allow the third sub image beam Lm3 to pass therethrough, and thereby combining the first sub image beam Lm1, the second sub image beam Lm2 and the third sub image beam Lm3 into the image beam Lm transmitted toward the projection lens 430. The projection lens 430 is configured to project the image beam Lm onto a screen so as to form an image on the screen.

The aforementioned first polarization and second polarization are exemplified by the P polarization and S polarization, respectively. However, the first polarization and the second polarization may be the S polarization and the P polarization in another embodiment, respectively. In addition, the illumination system 410 may further include a polarization conversion element 418. The polarization conversion element 418 is disposed between the light integration rod 210 and the X-type dichroic element 411 and configured to convert the polarization of the illumination beam Li into the first polarization. In addition, the illumination system 410 may further include lenses or other optical elements, such as a lens 419 disposed between the polarization conversion element 418 and the X-type dichroic element 411, a lens 451 disposed between the second polarization light splitter element 416 and the light splitter sheet 414, a lens 452 disposed between the light splitter sheet 414 and the third polarization light splitter element 417, and a lens 453 disposed between the first polarization light splitter element 413 and the first reflective element 412. In addition, the light integration rod 210 can be replaced by any one of the above-described light integration rods, such as the light integration rods 210a, 210b or 210c.

In the illumination system 410 of the projection apparatus 400 of the embodiment, the phosphor 213 is disposed in the light integration rod 210; therefore, the illumination beam Li can be formed through using the laser beam Le provided by the light source module 220 to excite the phosphor 213 in the light integration rod 210. Compared with the conventional illumination system 100 of FIG. 1, the number of the optical elements needed in the projection apparatus 400 of the embodiment is significantly reduced, and consequentially the projection apparatus 400 of the embodiment has reduced cost and component size.

Figure 10:
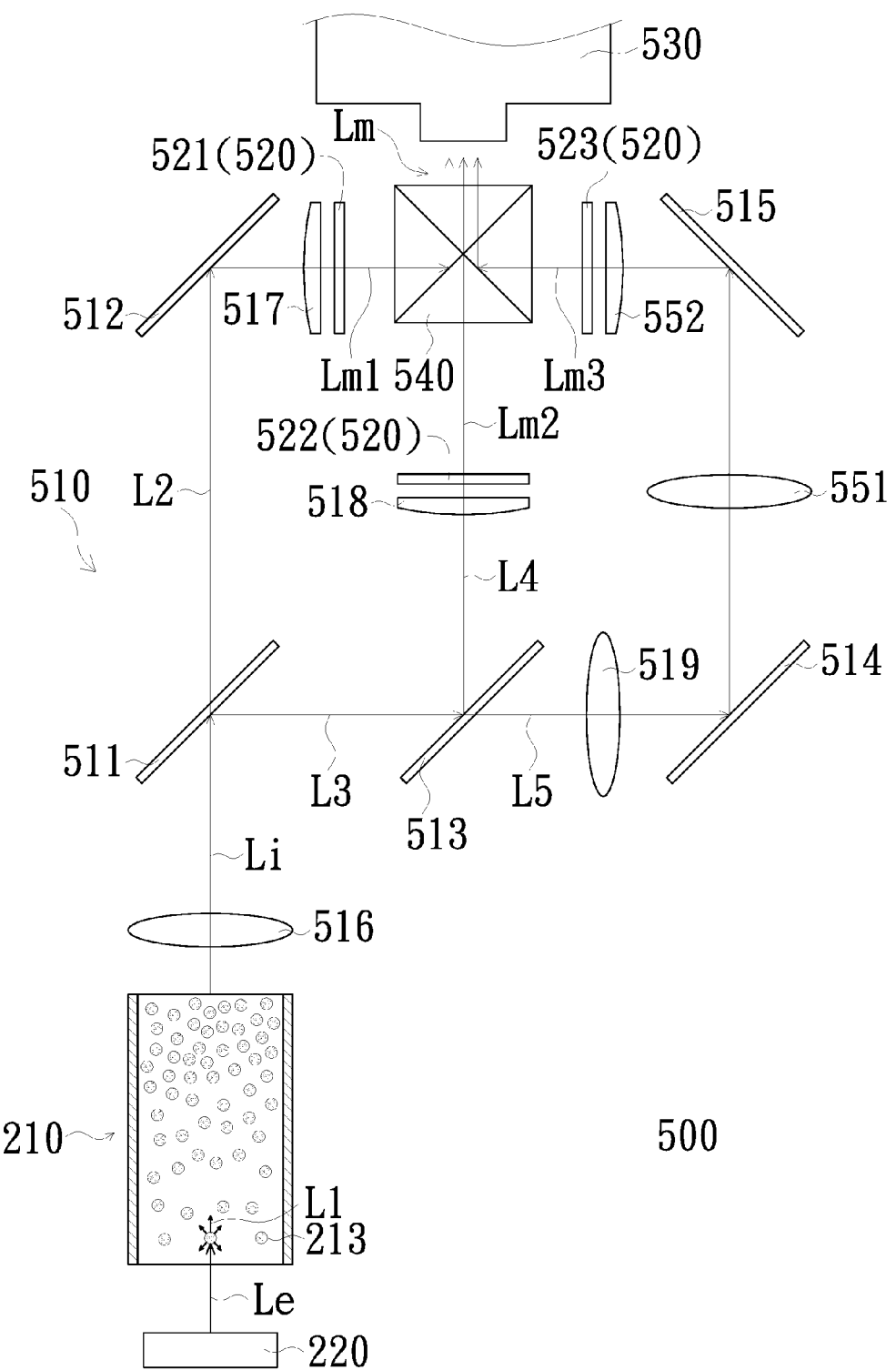
FIG. 10 is a schematic view of a projection apparatus in accordance with another embodiment of the invention.

FIG. 10 is a schematic view of a projection apparatus in accordance with another embodiment of the invention. As shown in FIG. 10, the projection apparatus 500 of the embodiment includes an illumination system 510, a light valve unit 520 and a projection lens 530. The structure of the illumination system 510 of the embodiment is similar to that of the illumination system 200 of FIG. 2, such as both include the light source module 220 and the light integration rod 210. The light valve unit 520 includes a first transmissive liquid crystal panel 521, a second transmissive liquid crystal panel 522 and a third transmissive liquid crystal panel 523. The projection apparatus 500 further includes an X-type beam combiner element 540 disposed among the first transmissive liquid crystal panel 521, the second transmissive liquid crystal panel 522 and the third transmissive liquid crystal panel 523.

The illumination system 510 of the embodiment further includes a first light splitter sheet 511, a first reflective element 512, a second light splitter sheet 513, a second reflective element 514 and a third reflective element 515. The operation of the projection apparatus 500 is described hereunder based on that that the illumination beam Li is a white light; wherein the illumination beam Li may be formed by a mix of the laser beam Le (a blue light) provided by the light source module 220 and the first color beam L1 (a yellow light) emitted out from the phosphor 213 or is formed by using the laser beam Le to excite the phosphor 213 to emit out a white light (that is, the first color beam L1 is a white light).

The first light splitter sheet 511 is disposed on the transmission path of the illumination beam Li and configured to split the illumination beam Li into the second color beam L2 and the third color beam L3; wherein the second color beam L2 can pass through the first light splitter sheet 511 and the third color beam L3 is reflected by the first light splitter sheet 511. In one embodiment, the second color beam L2 is a red light and the third color beam L3 includes a blue light and a green light. Further, the first reflective element 512 is disposed on the transmission path of the second color beam L2 and configured to reflect the second color beam L2 reflected to first transmissive liquid crystal panel 521. The first transmissive liquid crystal panel 521 is configured to convert the second color beam L2 into the first sub image beam Lm1 emitting toward the X-type beam combiner element 540.

The second light splitter sheet 513 is disposed on the transmission path of the third color beam L3 and configured to split the third color beam L3 into a fourth color beam L4 and a fifth color beam L5; wherein the fifth color beam L5 can pass through the second light splitter sheet 513 and the fourth color beam L4 is reflected by the second light splitter sheet 513 to the second transmissive liquid crystal panel 522. The second transmissive liquid crystal panel 522 is configured to convert the fourth color beam L4 into the second sub image beam Lm2 emitting toward the X-type beam combiner element 540.

The second reflective element 514 is disposed on the transmission path of the fifth color beam L5 and configured to reflect the fifth color beam L5. The third reflective element 515 is disposed between the second reflective element 514 and the third transmissive liquid crystal panel 523 and configured to reflect the fifth color beam L5 to the third transmissive liquid crystal panel 523. The third transmissive liquid crystal panel 523 is configured to convert the fifth color beam L5 into the third sub image beam Lm3 emitting toward the X-type beam combiner element 540. The X-type beam combiner element 540 is configured to reflect the first sub image beam Lm1 and the third sub image beam Lm3 and allow the second sub image beam Lm2 to pass therethrough, and thereby combining the first sub image beam Lm1, the second sub image beam Lm2 and the third sub image beam Lm3 into the image beam Lm transmitted toward the projection lens 530. The projection lens 530 is configured to project the image beam Lm onto a screen so as to form an image on the screen.

In addition, the illumination system 510 may further include lenses or other optical elements, such as a lens 516 disposed between the light integration rods 210 and the first light splitter sheet 511, a lens 517 disposed between the first transmissive liquid crystal panel 521 and the first reflective element 512, a lens 518 disposed between the second transmissive liquid crystal panel 522 and the second light splitter sheet 513, a lens 519 disposed between the second reflective element 514 and the second light splitter sheet 513, a lens 551 disposed between the second reflective element 514 and the third reflective element 515, and a lens 552 disposed between the third reflective element 515 and the third transmissive liquid crystal panel 523. In addition, the light integration rod 210 can be replaced by any one of the above-described light integration rods, such as the light integration rods 210$a$, 210$b$ or 210$c$.

In the illumination system 510 of the projection apparatus 500 of the embodiment, the phosphor 213 is disposed in the light integration rod 210; therefore, the illumination beam Li can be formed through using the laser beam Le provided by the light source module 220 to excite the phosphor 213 in the light integration rod 210 to generate the first color beam L1. Compared with the conventional illumination system 100 of FIG. 1, the number of the optical elements needed in the projection apparatus 500 of the embodiment is significantly reduced, and consequentially the projection apparatus 400 of the embodiment has reduced cost and component size.

Figure 11:
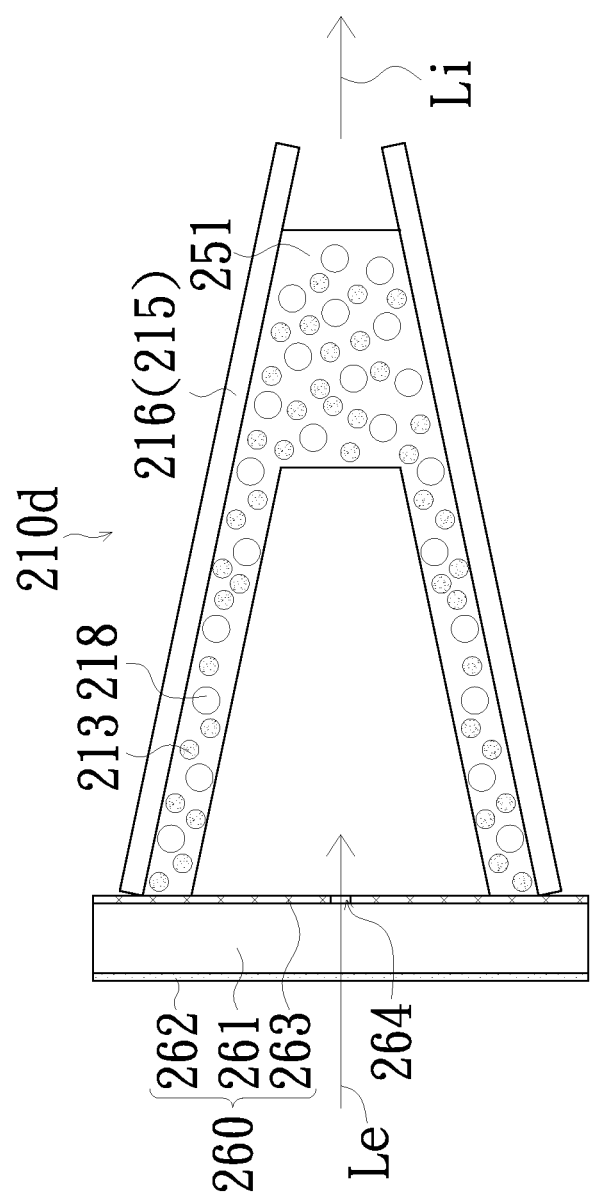
FIG. 11 is a schematic view of a light integration rod used in an illumination system in accordance with an embodiment of the invention.

FIG. 11 is a schematic view of a light integration rod used in an illumination system in accordance with an embodiment of the invention. Please refer to FIGS. 2 and 11. According to the design of the light integration rod 201$d$ of the embodiment as shown in FIGS. 2 and 11, the cross-sectional area of an in-let end of the light integration rod 201$d$ is greater than the cross-sectional area of an out-let end thereof; the front-end part of the light integration rod 201$d$ has a hollow design; and the phosphor 213, the transparent beads 218 and colloid 251 are coated on an inner surface of the reflective sheet 210 of the light integration rod 201$d$. In order to avoid the heat generated by the phosphor 213 is too accumulated and therefore reduce the light conversion efficiency of the phosphor 213 or even burn out the phosphor 213, the phosphor 213, the transparent beads 218 and the colloid 251 are filled in the rear part of the light integration rod 201$d$. Further, the in-let end of the light integration rod 201$d$ is provided with optical elements 260. Specifically, the optical elements 260 are disposed between the light source module 220 and the in-let end of the light integration rod 201$d$. The optical elements 260 may include a transparent substrate 261, a light splitter layer 262 and a reflective layer 263. The transparent substrate 261 is configured to transmit the laser beam Le provided by the light source module 220 to the inside of the light integration rod 201$d$. The light splitter layer 262 is configured to reflect the first color beam L1 back to the inside of the light integration rod 201$d$. The reflective layer 263 has an opening 264, through which the laser beam Le is transmitted to the light integration rod 201$d$. The reflective layer 263 is configured to reflect the first light beam L1 converted from the excitation light Le, thereby enhancing the utilization efficiency of the illumination beam Li combined by the laser beam Le and the first color beam L1.

Figure 12:
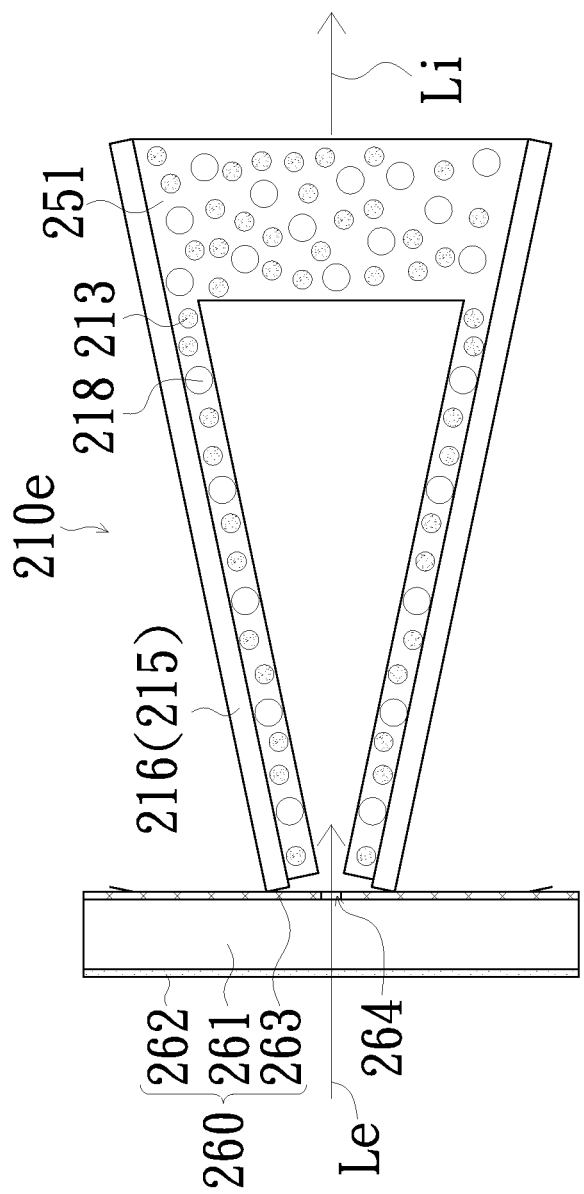
FIG. 12 is a schematic view of a light integration rod used in an illumination system in accordance with another embodiment of the invention.

FIG. 12 is a schematic view of a light integration rod used in an illumination system in accordance with another embodiment of the invention. As shown in FIG. 12, the light integration rod 210$e$ of the embodiment is similar to the light integration rod 201$d$ of FIG. 11. A difference lies in that the cross-sectional area of an in-let end of the light integration rod 201$e$ is smaller than the cross-sectional area of an out-let end thereof; therefore, no redundant detail is to be given herein.

Summarily, in the illumination system of the invention, the phosphor is disposed in the light integration rod; therefore, compared with the prior art, the number of the optical elements needed in the illumination system of the invention is significantly reduced, and consequentially the projection apparatus 400 of the embodiment has reduced cost and component size. Consequentially, the projection apparatus of the invention also has reduced cost and component size by employing the aforementioned illumination system.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. An illumination system, comprising:
    a light integration rod, comprising a light-in end, a light-out end opposite to the light-in end, and phosphor distributed between the light-in end and the light-out end; and
    a light source module, configured to provide a laser beam to emit into the light integration rod through the light-in end thereof,
    wherein the phosphor is adapted to convert the laser beam into a first color beam to form an illumination beam, and the illumination beam is adapted to emit out from the light integration rod through the light-out end thereof,
    wherein the phosphor has one of distribution densities, the distribution densities comprise:
        a distribution density of the phosphor gradually increasing from the light-in end to the light-out end;
        a distribution density of the phosphor gradually decreasing from the light-in end to the light-out end;
        a distribution density of the phosphor gradually increasing from the light-in end to a middle part of the light integration rod and then gradually decreasing from the middle part to the light-out end; and
        a distribution density of the phosphor gradually decreasing from a middle part of the light integration rod to the light-out end.

2. The illumination system according to claim 1, wherein the light integration rod further comprises:
    a solid column; and
    a reflective body,
    wherein the light-in end and the light-out end are two end surfaces of the solid column, the solid column is wrapped by the reflective body, the light-in end and the light-out end are exposed from the reflective body, and the phosphor is distributed in the solid column.

3. The illumination system according to claim 2, wherein the light integration rod further comprises a plurality of transparent beads distributed in the solid column, and refractive indexes of the transparent beads are different to that of the solid column.

4. The illumination system according to claim 2, wherein a material of the solid column is ceramic or glass.

5. The illumination system according to claim 1, wherein the light integration rod further comprises a reflective element disposed to cover a periphery of the light-in end.

6. The illumination system according to claim 1, further comprising a color wheel, wherein the color wheel is disposed on a transmission path of the illumination beam, and the light integration rod is disposed between the light source module and the color wheel.

7. The illumination system according to claim 1, wherein the light source module comprises:
    a plurality of laser emitting elements; and
    a lens, disposed between the plurality of laser light emitting elements and the light-in end of the light integration rod.

8. A projection apparatus, comprising
an illumination system, comprising:
    a light integration rod, having a light-in end, a light-out end opposite to the light-in end, and phosphor distributed between the light-in end and the light-out end; and
    a light source module, configured to provide a laser beam to emit into the light integration rod through the light-in end thereof, wherein the phosphor is adapted to convert the laser beam into a first color beam to form an illumination beam, the illumination beam is adapted to emit out from the light integration rod through the light-out end thereof, the phosphor has one of distribution densities, and the distribution densities comprise:
        a distribution density of the phosphor gradually increasing from the light-in end to the light-out end;
        a distribution density of the phosphor gradually decreasing from the light-in end to the light-out end;
        a distribution density of the phosphor gradually increasing from the light-in end to a middle part of the light integration rod and then gradually decreasing from the middle part to the light-out end; and a distribution density of the phosphor gradually decreasing from a middle part of the light integration rod to the light-out end;

a light valve unit, disposed on a transmission path of the illumination beam, configured to convert the illumination beam into an image beam; and a projection lens, disposed on a transmission path of the image beam.

9. The projection apparatus according to claim 8, wherein the illumination system further comprises a color wheel disposed on the transmission path of the illumination beam, the light integration rod is disposed between the light source module and the color wheel, and the color wheel is configured to sequentially filter the illumination beam into a plurality of sub illumination beams with different colors, wherein the light valve unit comprises a digital micro-mirror device configured to sequentially convert the sub illumination beams into a plurality of sub image beams.

10. The projection apparatus according to claim 8, wherein the illumination system further comprises a lens disposed between the light integration rod and the light valve unit, the lens is configured to receive the illumination beam emitted out from the light integration rod through the light-out end thereof.

11. The projection apparatus according to claim 10, wherein the light valve unit comprises a first reflective liquid crystal panel, a second reflective liquid crystal panel and a third reflective liquid crystal panel, wherein the projection apparatus further comprises an X-type beam combiner element disposed among the first reflective liquid crystal panel, the second reflective liquid crystal panel and the third reflective liquid crystal panel.

12. The projection apparatus according to claim 10, wherein the light valve unit comprises a first transmissive liquid crystal panel, a second transmissive liquid crystal panel and a third transmissive liquid crystal panel, wherein the projection apparatus further comprises an X-type beam combiner element disposed among the first transmissive liquid crystal panel, the second transmissive liquid crystal panel and the third transmissive liquid crystal panel.

13. An illumination system, comprising:
a light integration rod, comprising a light-in end, a light-out end opposite to the light-in end, and a phosphor distributed between the light-in end and the light-out end; and
a light source module, configured to provide a laser beam to emit into the light integration rod through the light-in end thereof,
wherein the phosphor is adapted to convert the laser beam into a first color beam to form an illumination beam, and the illumination beam is adapted to emit out from the light integration rod through the light-out end thereof, and
wherein the light integration rod comprises a hollow column, the light-in end and the light-out end are two ends of the hollow column, and the phosphor is distributed on an inner surface of the hollow column.

14. The illumination system according to claim 13, wherein a plurality of transparent beads and the phosphor are distributed on an inner surface of the hollow column.

15. A projection apparatus, comprising
an illumination system, comprising:
a light integration rod, having a light-in end, a light-out end opposite to the light-in end, and phosphor distributed between the light-in end and the light-out end; and
a light source module, configured to provide a laser beam to emit into the light integration rod through the light-in end thereof,
wherein the phosphor is adapted to convert the laser beam into a first color beam to form an illumination beam, and the illumination beam is adapted to emit out from the light integration rod through the light-out end thereof, and
wherein the light integration rod comprises a hollow column, the light-in end and the light-out end are two ends of the hollow column, and the phosphor is distributed on an inner surface of the hollow column;
a light valve unit, disposed on a transmission path of the illumination beam, configured to convert the illumination beam into an image beam; and
a projection lens, disposed on a transmission path of the image beam.

16. The projection apparatus according to claim 15, wherein a plurality of transparent beads and the phosphor are distributed on an inner surface of the hollow column.

* * * * *